United States Patent
Lazarus

(10) Patent No.: US 8,271,988 B2
(45) Date of Patent: Sep. 18, 2012

(54) SYSTEM-GENERATED RESOURCE MANAGEMENT PROFILES

(75) Inventor: Lewis J Lazarus, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 1146 days.

(21) Appl. No.: 11/937,793

(22) Filed: Nov. 9, 2007

(65) Prior Publication Data

US 2009/0125910 A1 May 14, 2009

(51) Int. Cl.
*G06F 9/46* (2006.01)
*G06F 3/048* (2006.01)
*G06F 15/00* (2006.01)
*G06F 15/16* (2006.01)

(52) U.S. Cl. ...... 718/104; 715/764; 358/1.15; 358/1.16; 709/228; 709/218

(58) Field of Classification Search .................. None
See application file for complete search history.

(56) References Cited

U.S. PATENT DOCUMENTS

| | | | |
|---|---|---|---|
| 5,535,312 A | 7/1996 | Hammer et al. | |
| 5,717,842 A | 2/1998 | Ambalavanar et al. | |
| 5,745,652 A | 4/1998 | Bigus | |
| 5,867,495 A | 2/1999 | Elliott et al. | |
| 6,452,692 B1 * | 9/2002 | Yacoub | 358/1.15 |
| 6,516,350 B1 | 2/2003 | Lumelsky et al. | |
| 6,591,262 B1 * | 7/2003 | MacLellan et al. | 1/1 |
| 6,898,602 B2 | 5/2005 | Sayag | |
| 6,970,259 B1 | 11/2005 | Lunt et al. | |
| 7,043,321 B2 | 5/2006 | Ruml et al. | |
| 7,080,892 B2 | 7/2006 | Moriyama et al. | |
| 7,110,541 B1 | 9/2006 | Lunt et al. | |
| 7,474,424 B2 | 1/2009 | Hokiyama | |
| 7,512,903 B2 * | 3/2009 | Hudson, Jr. | 715/853 |
| 7,639,381 B2 | 12/2009 | Shima | |
| 7,710,586 B2 | 5/2010 | Lazarus | |
| 7,813,822 B1 | 10/2010 | Hoffberg | |
| 7,912,388 B2 | 3/2011 | Toda | |
| 7,990,553 B2 | 8/2011 | Aritomi et al. | |
| 8,010,942 B1 * | 8/2011 | Mirza et al. | 717/109 |
| 2002/0053011 A1 | 5/2002 | Aiken et al. | |
| 2004/0095602 A1 | 5/2004 | Sugishita et al. | |
| 2004/0141203 A1 | 7/2004 | Honma | |
| 2004/0196493 A1 * | 10/2004 | Christiansen et al. | 358/1.15 |
| 2005/0007627 A1 | 1/2005 | Ha | |
| 2005/0055476 A1 | 3/2005 | Aschenbrenner et al. | |
| 2005/0149940 A1 | 7/2005 | Calinescu et al. | |
| 2006/0050313 A1 | 3/2006 | Hashimoto et al. | |
| 2006/0265738 A1 | 11/2006 | Chrysanthakopoulos et al. | |
| 2007/0127053 A1 | 6/2007 | Tominaga | |
| 2007/0268512 A1 | 11/2007 | Sakakibara | |
| 2007/0273917 A1 | 11/2007 | Encrenaz et al. | |
| 2009/0125911 A1 | 5/2009 | Lazarus | |
| 2010/0097661 A1 | 4/2010 | Hoblit | |

* cited by examiner

*Primary Examiner* — Camquy Truong
(74) *Attorney, Agent, or Firm* — MH2 Technology Law Group LLP

(57) ABSTRACT

A method for computer control of collaborating devices enables automatic generation of resource management profiles to coordinate resource allocation within the collaborating device. The method includes utilization of a graphical user interface to select an initial resource management profile and instruct the device to automatically generate a resource profile. Timing is specified for creation of the automatically generated optimized resource profile. The optimized resource profile is developed from statistics maintained, collected, and interpreted about the demand for resources within each component of the collaborating device. An operator may elect to automatically invoke the most recently generated optimized profile after a specified period of collaborating device idleness or to invoke it upon an instruction from the operator. The optimized resource profile may be saved for future use or discarded.

25 Claims, 4 Drawing Sheets

SYSTEM-GENERATED RESOURCE MANAGEMENT PROFILES

CROSS-REFERENCE TO RELATED APPLICATIONS

The following co-pending application, U.S. application Ser. No. 11/937,810, filed Nov. 9, 2007, titled "Resource Management Profiles", is assigned to the same assignee of the present application. The entire disclosure of this co-pending application is totally incorporated herein by reference in its entirety.

BACKGROUND AND SUMMARY

This disclosure relates generally to computer controlled systems for digital document processing within a networked environment, and more particularly to a system and method for automatic, system-generated suggested allocations for components using pre-allocated resources in the form of resource management profiles for optimization of resource utilization for various printing tasks.

In the area of digital printing and copying, various approaches have been applied in an attempt to dynamically optimize resource utilization for digital printing tasks. However, when large contiguous blocks of memory are required, it is not practical to allocate large or complex resources dynamically, and allocations must be set in advance. When a system can be used for a variety of applications, there is a likelihood that the initial allocation will not be efficient for all circumstances, and may in some instances lead to system failure. This problem has been addressed by several approaches. One of these approaches is a system imposed resource budget, which provides for average use, but is suboptimal in many situations.

Alternatively, a "garbage collector" in software periodically frees unused resources, or transfers little used resources to a secondary location, for example, virtual memory. However, this approach is not appropriate in some cases, such as for managing large contiguous blocks of physical memory. Another approach is adaptive resource management, which periodically evaluates resource demand, and automatically adjusts allocations, when necessary. However, in some cases it is not appropriate to change memory allocations automatically, even if they are not optimal. For example, changing mildly inefficient printer memory allocations in the middle of a print job could cause a delay, leading to poorer overall performance than if no change had been applied. In this instance, as in garbage collection, even if an efficient allocation is eventually achieved, the system typically starts from an inefficient state each time it is used for a different application.

An alternate approach is the use of resource management profiles, which enable an operator to assign a percentage of memory, or other resources, to each component for printing devices in a network printing system. Rather than using a single hard-coded resource budget, the Resource Profile Manager (RPM) lists feature areas supported by a printing device, and allows the operator to enable or disable specific features. The system would then use the resulting resource profile to coordinate static allocations of memory, or other resources, for the entire system in an intelligent way, optimizing system response for the stated pattern of feature use. However, this requires that an operator be sufficiently knowledgeable of resource requirements to make optimum selections.

It would be useful to have a resource management system that would periodically evaluate demand and automatically create a set of suggested allocations for all components that use pre-allocated resources. Such a system would preferably save system proposed allocations as a new resource profile. Once a profile is created and stored, it could be invoked manually by an operator at an appropriate time or applied automatically after a specified period of system idleness. Such an approach would enable more efficient use of resources, such as memory, within high end printing systems, and would provide for coordinated allocations across components. This would avoid the problems associated with system imposed resource budgets, a "garbage collector", and adaptive resource management. Additionally, it would provide effective utilization of resources in those situations in which there are large variations in usage patterns or applications.

All U.S. patents and published U.S. patent applications cited herein are fully incorporated by reference. The following patents or publications are noted.

U.S. Pat. No. 6,898,602 to Sayag ("Measuring the Exact Memory Requirement of an Application Through Intensive Use of Garbage Collector") describes a method and apparatus for the intensive use of garbage collection in order to determine the exact amount of memory that is consumed by a running application at any point of its execution. A garbage collector executes immediately prior to allocations of memory during execution of a program. The amount of memory used by the application is known after each such allocation of memory, and is very close to or equal to its theoretical requirement. A developer is enabled to determine whether a specified memory allotment for an application is exceeded.

U.S. Pat. No. 6,516,350 to Lumelsky et al. ("Self-regulated Resource Management of Distributed Computer Resources") describes a distributed system for the management of distributed resources interconnected by a computer network and comprised of a plurality of limited supply resources (such as those associated with multimedia content servers). The system includes a plurality of server resources, preferably with target multimedia content, real time processing engines, etc., and a plurality of intermediary system resources (such as directories and resource monitors). The resources in any particular server are classified or partitioned as global or local, where the ratio of global to local is specified and controlled by the system. The system assigns clients across local and global resources and coordinates the placement of replicas of target content across global resources. The placement is dynamic and performed when necessary based on the analysis of utilization patterns of target content and replicas by pluralities of clients.

U.S. Pat. No. 5,745,652 to Bigus ("Adaptive Resource Allocation Using Neural Networks") describes a resource allocation controller function, which is customized to a particular system's available resources and configuration, that dynamically allocates resources and/or alters configurations to accommodate a changing workload. The resource allocation controller is part of the computer's operating system which allocates resources of the computer system. The resource allocation controller uses a controller neural network for control, and a separate system model neural network for modeling the system and training the controller neural network. Performance data is collected by the system and used to train the system model neural network. A system administrator specifies computer system performance targets which indicate the desired performance of the system. Deviations in actual performance from desired performance are propagated back through the system model and ultimately to the controller neural network to create a closed loop system for resource allocation.

The disclosed embodiments provide examples of improved solutions to the problems noted in the above Background discussion and the art cited therein. There is shown in these examples an improved method for computer control of collaborating devices enabling automatic generation of resource management profiles to coordinate resource allocation within the collaborating device. The method includes utilization of a graphical user interface to select an initial resource management profile and instruct the device to automatically generate a resource profile. Timing is specified for creation of the automatically generated optimized resource profile. The optimized resource profile is developed from statistics maintained, collected, and interpreted about the demand for resources within each component of the collaborating device. An operator may elect to automatically invoke the most recently generated optimized profile after a specified period of collaborating device idleness or to invoke it upon an instruction from the operator. The optimized resource profile may be saved for future use or discarded.

In an alternate embodiment there is disclosed a system for computer control of collaborating devices in a networked environment. The system includes a resource management graphical user interface that causes the computer to perform method steps for controlling at least one collaborating device to automatically generate resource management profiles to coordinate resource allocation within the collaborating device. From the graphical user interface an operator selects a resource management profile, which may include a default resource profile delivered with the collaborating device, an existing resource profile, or a new profile, with each profile including collaborating device resource allocation settings associated with specific tasks. The operator may instruct the device to automatically generate an optimized resource profile through activation of a feature on said graphical user interface and may also specify timing for delivery of the optimized resource profile. The optimized resource profile is generated from statistics about the demand for resources within each component of the collaborating device. When the statistics have been collected and interpreted to produce the optimized profile, an operator may elect to apply the optimized profile automatically or upon the express command of the operator.

In yet another embodiment there is disclosed a resource management graphical user interface accessible on a computer-controlled printing system for causing the printing system to automatically generate resource management profiles to coordinate resource allocation within the printing system. The user interface displays a current resource management profile, which includes printing system resource allocations associated with specific jobs. The interface also includes a resource profile list of profile names for various job types. The features associated with each job type are associated with controls to enable an operator to set allocations for resource usage. An option is provided to instruct the printing system to generate at least one resource profile automatically. Operational options are also provided and include deleting a profile, approving a profile, applying a profile to a print job, saving a new profile, replacing an existing profile, and canceling a profile modification. The user interface further transmits instructions to apply a profile to the printing system for printing of a job.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
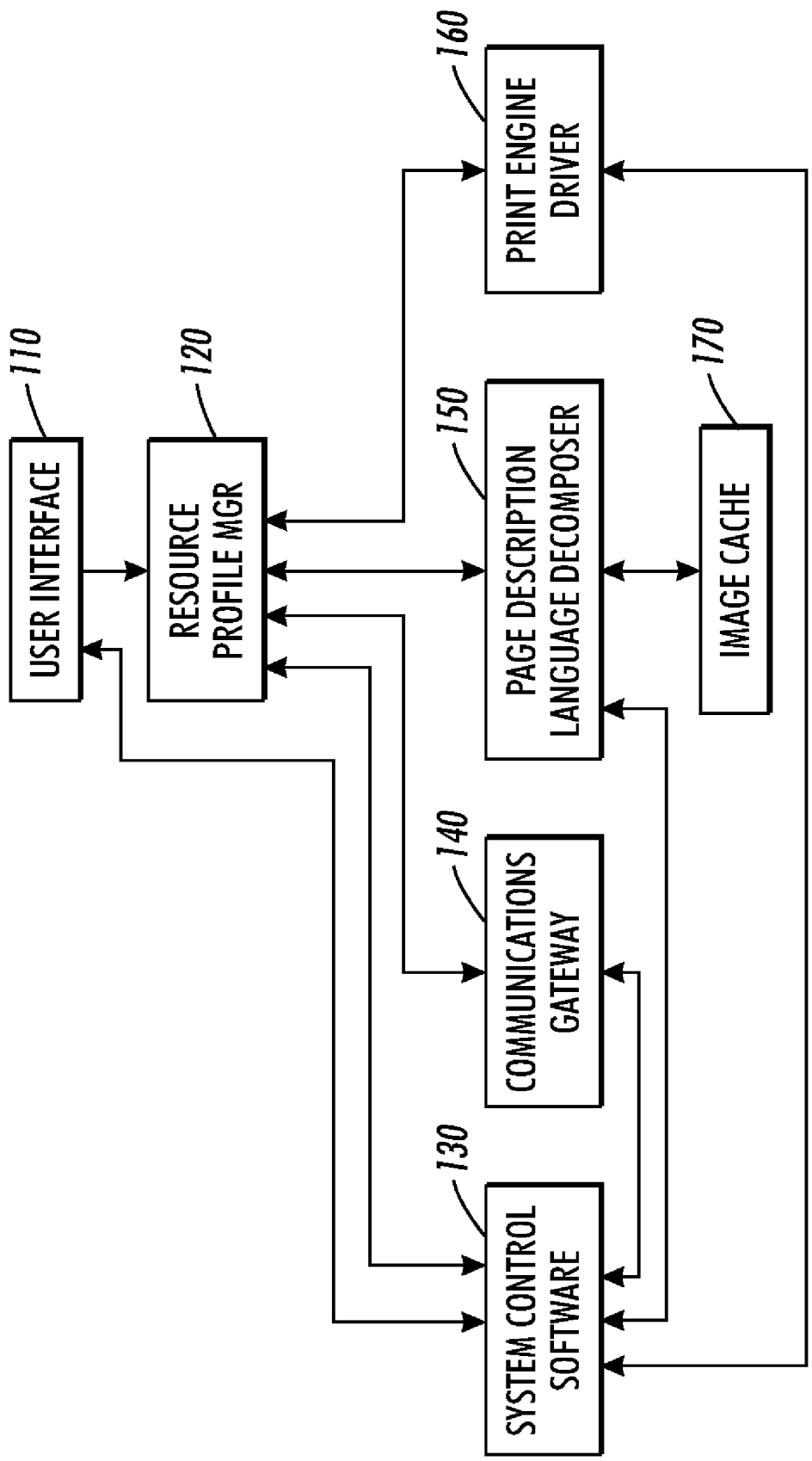
FIG. 1 is a schematic illustration of one embodiment of a system capable of generating resource management profiles.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The method and system for developing and utilizing resource management profiles described herein enables automatic, system-generated resource management profiles that assign a percentage of memory, or other resources, to each component for printing devices in a network printing system. The resource management system periodically evaluates demand, and creates a set of suggested allocations for all components that use pre-allocated resources, such as memory. Using a Resource Profile Manager (RPM), the system saves a set of allocations, proposed by the system, as a new resource profile. The RPM can be configured to store these system generated resource profiles either automatically, or in response to an operator's command. Once a profile has been stored, the operator can invoke it manually at an appropriate time, for example, before another run of an application. Alternatively, the RPM can be configured to apply a system generated profile automatically after a specified period of system idleness.

While for the purposes of explanation the method and system will be described as functioning within a network including various printing and communication devices, it will be appreciated by those skilled in the art that development and use of resource management profiles may be beneficially utilized in any network environment which requires efficient utilization of system resources. All such variations and modifications are fully contemplated by the scope of the specification and claims herein.

Various computing environments may incorporate capabilities for developing and using system-generated resource management profiles to allocate memory or other network resources for efficient operation of printing devices. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, the block diagram illustrates an example embodiment of a system that provides the capability for resource management using system-generated resource profiles. While for the purposes of discussion, the resource management system will be described applied to operation of a printing system, it is noted that the resource management system described herein would also be beneficially applied to coordinate resource management for various types of collaborating devices on a network, for example, telecom networks, audio and video sequencing software, etc., all of which are contemplated by the disclosure and scope of the claims herein.

Control of the system is exercised through the resource profile management user interface of an individual device, such as a printer. The resource profile management user interface 110 receives instructions from an operator and transmits these instructions, such as an instruction to set a starting resource profile, to the resource profile manager 120. Resource profile management interface 110 also displays suggested profiles received from resource profile manager 120 and receives instructions to accept suggested profile(s) from the operator. The functionality of the resource profile manager 120 includes instructing the system control software module 130, the communications gateway 140, the page description language decomposer 150, image cache 170, and the print engine driver 160 to set up the initial resource allocation and also to provide resource utilization data to enable the resource profile manager 120 to construct a suggested profile. Resource profile manager 120 includes a timer which sets a time period (either a specified time period or the end of a job) for gathering resource utilization data.

Communications gateway 140 receives print job instructions from the host device and transmits instructions to print data to page description language decomposer 150. Communications gateway 140 additionally tracks resource usage and transmits this information to the resource profile manager 120 upon request. Page description language decomposer 150 (PDLD) instructs image cache module 170 to cache reusable print data as necessary; in addition, it processes the print data and instructs image cache module 170 to retrieve the print data. Page description language decomposer 150 also transmits instructions and rasterized print data to print engine driver 160 and tracks its own resource use. Image cache module 170 also tracks its resource use and returns this information to the resource profile manager 120. Print engine driver 160 prints the job and tracks its resource use. This information is returned to resource profile manager 120.

Figure 2:
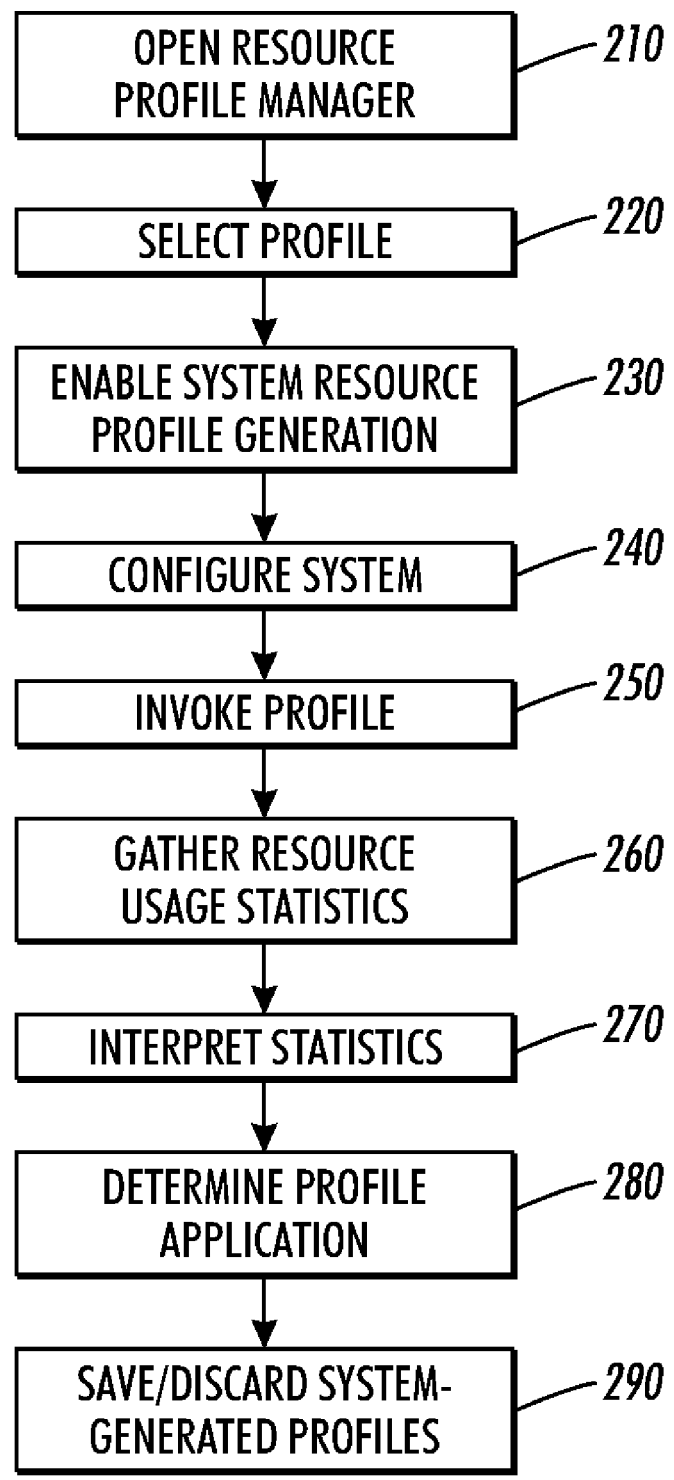
FIG. 2 is a flowchart illustrating an example embodiment of a method for resource management utilizing system-generated resource profiles.

Turning now to FIG. 2, the flowchart illustrates an example embodiment of the method for resource management utilizing system-generated resource profiles. Before running a print job, application, or a series of jobs, at 210 an operator navigates to the resource management user interface through the interface of the host printer. At 220 the operator selects a profile and may choose to use either a default resource profile delivered with the host system, an existing profile, perhaps created by the system for an application that was run previously, or a new profile, created specifically for the job which is to be performed. The operator may then enable system resource profile generation at 230 by means of a graphical user interface (GUI) provided by the system, such as a checkbox on a Resource Manager dialog. At 240 the operator configures the system for when to provide suggested profiles. This may be in response to the expiration of a user or system determined time-out interval, in response to an operator's request, or the system could be configured to provide a suggested profile at the completion of each job.

The operator enters a selection for whether or not to invoke the most recent system-generated profile at 250, after a specified period of idleness of the system. If the operator elects to invoke the profile automatically, the system may also offer the operator a choice of how much idle time must pass before the new profile is applied. Once the system starts processing a job or application, each system component maintains statistics about the demand for resources under its control at 260. Components also gather statistics about the resource requests they made to other components. At a time specified by the operator, the Resource Profile Manager (RPM) collects and interprets the statistics gathered by the relevant components and uses them to create an optimized resource profile at 270. Depending on how the system was configured, the system-generated resource profile may be applied automatically, after a specified period of system idleness, or may be offered to the operator through the RPM dialog at 280. At 290 the operator may use the RPM dialog to save system-generated profiles for future use, or may discard profiles that were no longer required.

Figure 3:
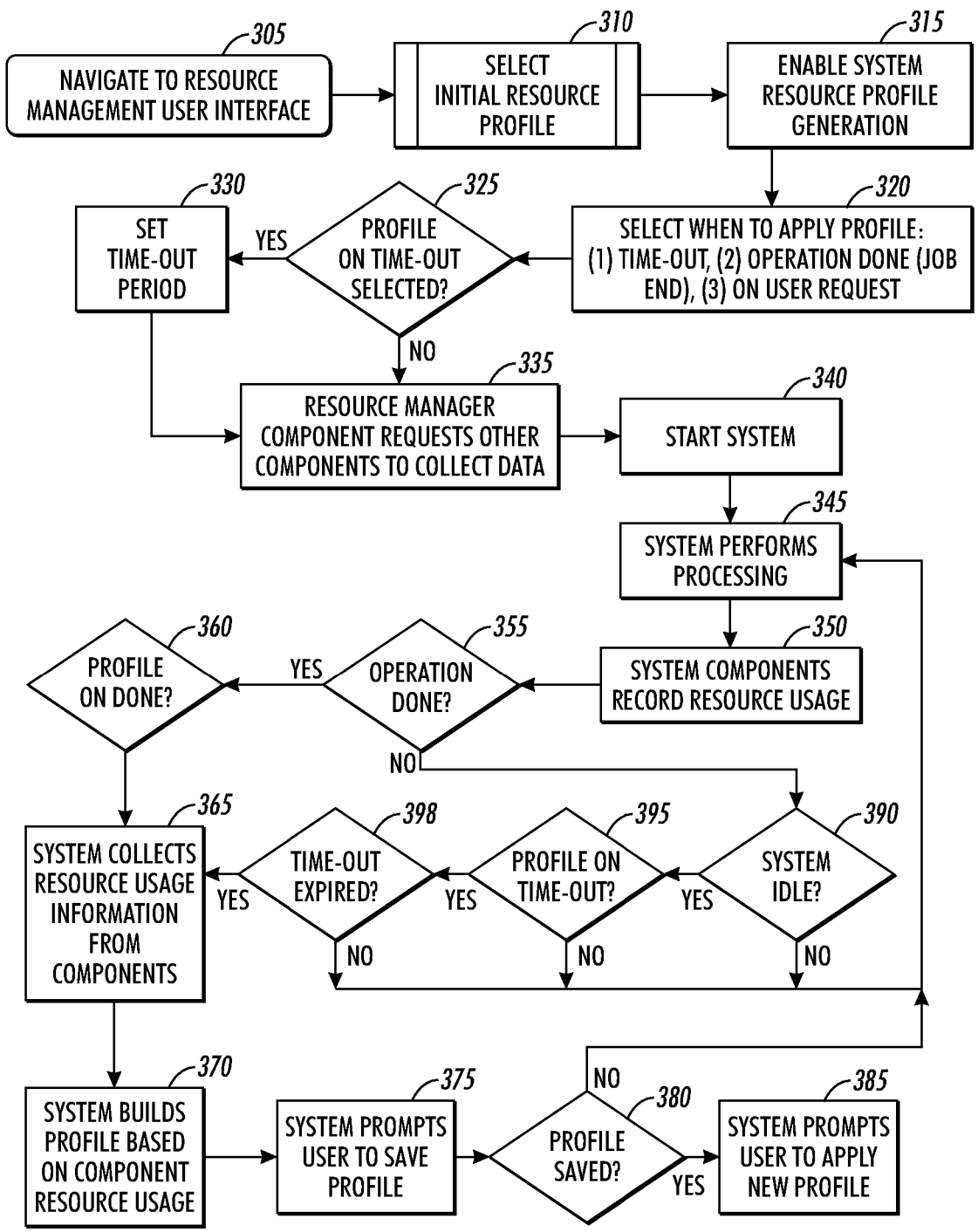
FIG. 3 is a flowchart illustrating another example embodiment of a method for resource management utilizing system-generated resource profiles.

Referring now to FIG. 3, the flowchart illustrates another example embodiment of the method for creation of system-generated resource management profiles. At 305 an operator navigates to the Resource Management user interface on the host printer. The operator selects an initial resource profile, which may be a default resource profile delivered with the host system, an existing profile, perhaps created by the system for an application that was run previously, or a new profile, created specifically for the job which is to be performed, at 310. At 315 the operator enables system resource profile generation on the user interface, utilizing any means known in the art, including but not limited to highlighting an option, selecting an icon or button, selecting an item from a drop down menu, or checking a box provided on the interface.

At 320 the operator additionally selects when to apply the profile, at a time-out, at job end, or on the operator's request. A determination is made at 325 as to whether the profile will be applied at time-out (a specified period of time). If a profile is to be applied at the end of a time-out period, the operator specifies the time-out period at 330. This may be accomplished by any known means, for example, with check boxes, spin boxes, drop downs, and type-in fields. When the time-out period has been set, or if the profile is not to be applied on a time-out period, the resource manager component requests other components to collect data at 335. At 340 the operator submits a print job and the system performs processing at 345.

The system components record resource usage at 350. A determination is made at 355 as to whether printing for the job has completed. If printing is complete, an assessment is made at 360 as to whether the profile is to be applied at the end of the job. If the profile is to be applied at the end of the job, the system collects resource usage information from the various components at 365. If the print job has not completed, a query as to whether the system is idle is made at 390. If the system is not idle, the system continues processing the print job. If the system is idle, it is queried whether the profile is to be applied on a time-out at 395. If the profile is not to be applied on a time-out, the system continues processing the print job.

If the profile is to be applied on a time-out, the system is queried whether the time-out has expired at 398. If the time-out has not expired, the system continues processing the print job. If the time-out has expired, the system collects resource usage information from the components at 365. The system builds a profile based on component resource usage at 370. At 375 the system prompts the operator to save the system-generated profile. The system is queried at 380 whether the profile has been saved. If so, the system prompts the operator to apply the new profile at 385. If the operator elects to apply the new profile, system processing is performed with the new profile activated. If the operator elects not to apply the new profile, system processing is performed with the previously selected profile. If the profile is not saved, processing continues using the previously selected profile.

Figure 4:
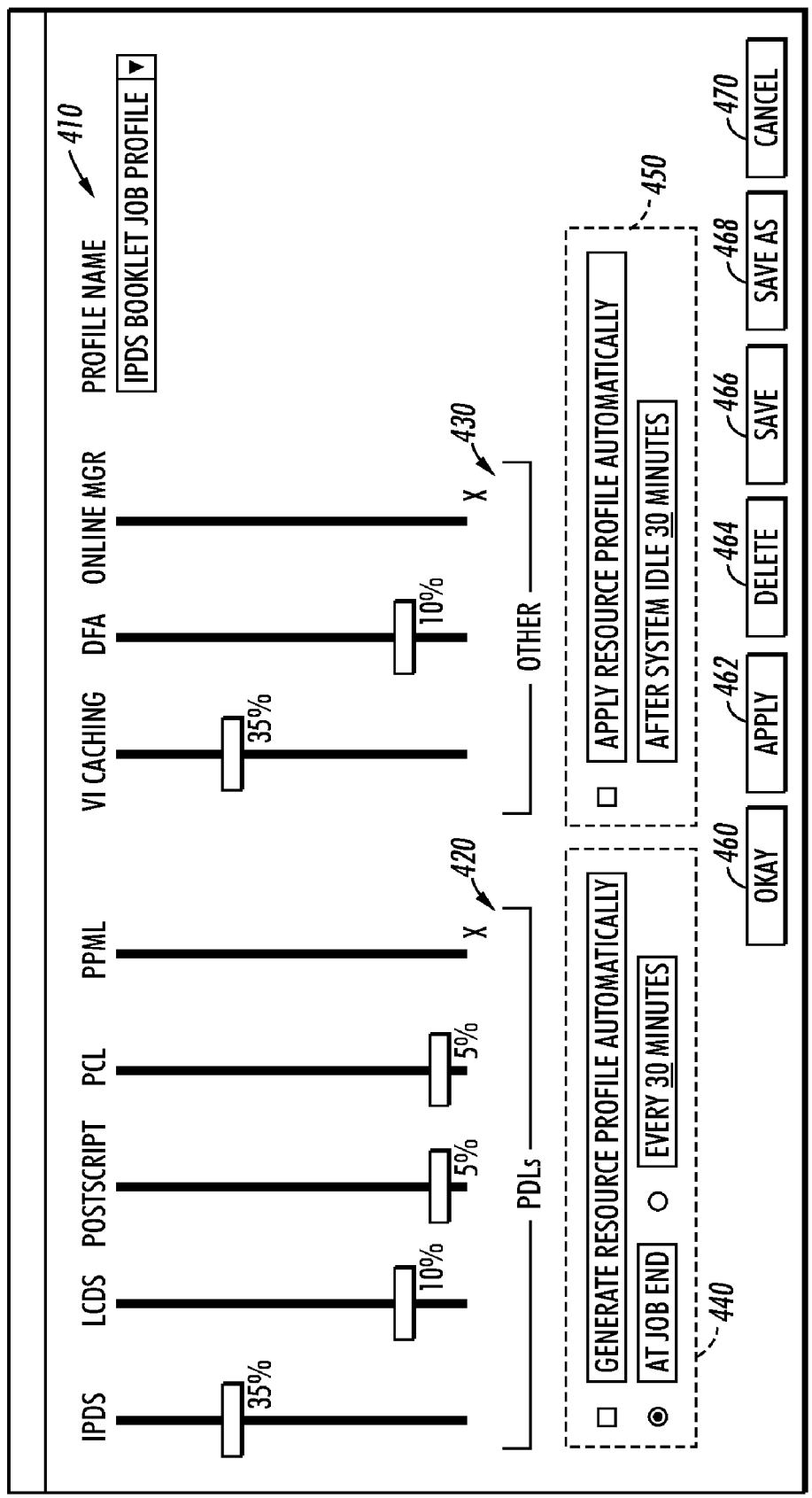
FIG. 4 is an illustration of an example embodiment of a user interface utilized for system-generated resource profile management.

Turning now to FIG. 4, an example embodiment of a GUI for system-generated resource profile management is illustrated. While various approaches may be utilized for a user interface, one possible embodiment is illustrated in FIG. 4. As depicted in the figure the system administrator or operator may select a profile name 410 from a drop-down list, which may have various entries for different purposes. For the purposes of this illustration, the IPDS Booklet Job Profile has been selected. Listing 420 provides the various PDL (Page Description Language) job types available. As depicted in the figure, the operator would move slider controls to set memory percentages for specific job types. The user interface may be based on percentages in such a way that adding to one element would force the percentage allocated to other elements to be reduced, so that the total allocation never exceeded 100%. Alternatively, a weighting scheme could be used that would set relative values that the resource profile manager would later use to determine the actual percentage. With either approach the operator would determine the overall profile for the entire system. Although for the purposes of this FIG. 4 slider controls are utilized, numerous other approaches may be used, for example, dials, radio buttons, spin boxes, arrows, or resizable boxes within a larger rectangle representing the available memory space.

For the purposes of this embodiment, the PDLs included are IPDS (Intelligent Printer Data Stream), LCDS (Line Conditioned Data Stream), PostScript, PCL (Printer Control Language), and PPML (Personalized Print Markup Language). Listing 430 presents other available system features or components. The examples in the diagram include VI Caching, DFA (Document Feeding and Finishing Architecture) and Online Manager. The Profile Generation Control area 440 provides options for when to generate resource profiles automatically. In this example embodiment, the selections are at job end or every thirty (30) minutes (or any other desired time period, as entered by the user in the underlined field). Alternatively, or in addition to these options, the system-generated profile could be created at the operator's request. The Profile Application Control area 450 provides options on when to apply the system-generated resource profiles. In this example embodiment the options are to apply the resource profile automatically or after the system has been idle thirty (30) minutes, or any other specified time, as entered by the user in the underlined field shown in the diagram.

The operator may delete a system-generated profile by selecting delete button 464. If the operator is satisfied with the current settings, okay button 460 may be selected. If the operator desires the system-generated profile to replace the original profile, save button 466 is utilized. Alternatively, if the operator desires to retain the original profile and save the new system-generated profile, save as button 468 is selected. To apply the settings to a job to be processed, the apply button 462 is selected. Cancel button 470 enables the operator to cancel any selections made concerning automatic generation of or application of resource profiles. Any of numerous approaches known in the art may be utilized to adjust percentages and select buttons 460, 462, 464, 466, 468, and 470 on the user interface.

While the present discussion has been illustrated and described with reference to specific embodiments, further modification and improvements will occur to those skilled in the art, especially as this concept is applied to domains other than printing systems. Also, the examples of printing systems given in these embodiments only provide simplified examples. An implementation of system generated profiles for more complex printing systems would be reflected in variations of the user interface. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for computer control of collaborating devices in a networked environment to enable an operator to access a resource management graphical user interface to instruct at least one collaborating device to automatically generate resource management profiles to coordinate resource allocation within the collaborating device, the method comprising:

navigating to the resource management graphical user interface;

selecting at least one resource management profile, wherein the resource management profile includes information related to a type and an amount of resources of the at least one collaborating device to be used for execution of a particular job and wherein said resource management profile comprises at least one member selected from the group comprising at least one default resource management profile delivered with the collaborating device, at least one existing resource management profile, and at least one new resource management profile, wherein said resource management profile includes collaborating device resource allocation settings associated with the particular job;

instructing the collaborating device to automatically generate at least one resource management profile through activation of a feature on said graphical user interface;

specifying timing for the collaborating device to provide said automatically generated resource management profile;

determining whether to invoke the most recent generated resource management profile after a specified period of collaborating device idleness;

maintaining statistics about a demand for resources within each component of the collaborating device;

collecting and interpreting said statistics, wherein said statistics are used to create an optimized resource management profile;

instructing the collaborating device to apply said optimized resource management profile to the particular job, wherein said instruction causes said collaborating device to perform said particular job using said optimized resource management profile; and determining whether to save or discard said optimized resource management profile.

2. The method according to claim 1, wherein the collaborating device comprises a printing system.

3. The method according to claim 1, wherein said resource management profile is selected from a drop down list.

4. The method according to claim 1, wherein said new resource management profile is created by the operator through adjustment of resource utilization, wherein said utilization may be expressed as percentages or through a weighting scheme.

5. The method according to claim 4, wherein expression of said utilization is accomplished through the use of at least one member selected from the group comprising slider controls, dials, radio buttons, spin boxes, arrows, and resizable boxes.

6. The method according to claim 1, wherein activating said feature is accomplished by use of at least one member selected from the group comprising highlighting an option, selecting an icon, selecting a button, and selecting an item from a drop down menu.

7. The method according to claim 1, wherein said timing for the collaborating device to provide said automatically generated resource management profile includes at least one member selected from the group comprising expiration of a time period, in response to an operator's request, and at the completion of at least one job.

8. The method according to claim 7, wherein said time period is specified by the operator or by the collaborating device.

9. The method according to claim 8, wherein said time period specified by the operator is accomplished through at least one member selected from the group comprising check boxes, spin boxes, drop downs, and type-in fields.

10. The method according to claim 1, wherein the operator specifies an amount of time that must pass before said most recent generated resource management profile is invoked.

11. The method according to claim 1, wherein said optimized resource management profile may be applied automatically by the collaborating device, after a specified period of collaborating device idleness, or at the instruction of the operator.

12. A system for computer control of collaborating devices in a networked environment, wherein the system includes a resource management graphical user interface that causes the computer to perform method steps for controlling at least one collaborating device to automatically generate resource management profiles to coordinate resource allocation within the collaborating device when the graphical user interface is accessed and utilized by an operator, the system comprising:

a processor in communication with a computer-readable memory;

the resource management graphical user interface comprising:

a mechanism operable to navigate to the resource management graphical user interface;

a mechanism operable to select at least one resource management profile, wherein the resource management profile includes information related to a type and an amount of resources of the at least one collaborating device to be used for execution of a particular job and wherein said resource management profile comprises at least one member selected from the group comprising at least one default resource management profile delivered with the collaborating device, at least one existing resource management profile, and at least one new resource management profile, wherein said resource management profile includes collaborating device resource allocation settings associated with said particular job;

a mechanism operable to instruct the collaborating device to automatically generate at least one resource management profile through activation of a feature on said graphical user interface;

a mechanism operable to specify timing for the collaborating device to provide said automatically generated resource management profile;

a mechanism operable to determine whether to invoke the most recent generated resource management profile after a specified period of collaborating device idleness;

a mechanism operable to maintain statistics about a demand for resources within each component of the collaborating device;

a mechanism operable to collect and interpret said statistics, wherein said statistics are used to create an optimized resource management profile;

a mechanism operable to instruct the collaborating device to apply said optimized resource management profile to said particular job, wherein said instruction causes said collaborating device to perform said particular job using said optimized resource management profile; and a mechanism operable to determine whether to save or discard said optimized resource management profile.

13. The system according to claim 12, wherein said collaborating device comprises a printing system.

14. The system according to claim 13, wherein said optimized resource management profile may be applied automatically by the print system, after a specified period of print system idleness, or at the instruction of the operator.

15. The system according to claim 12, wherein said resource management profile is selected from a drop down list.

16. The system according to claim 12, wherein said new resource management profile is created by the operator through adjustment of resource utilization, wherein said utilization may be expressed as percentages or through a weighting scheme.

17. The system according to claim 16, wherein expression of said utilization is accomplished through the use of at least one member selected from the group comprising slider controls, dials, radio buttons, spin boxes, arrows, and resizable boxes.

18. The system according to claim 12, wherein activating said feature is accomplished by use of at least one member selected from the group comprising highlighting an option, selecting an icon, selecting a button, and selecting an item from a drop down menu.

19. The system according to claim 13, wherein said timing for the printing system to provide said automatically generated resource management profile includes at least one member selected from the group comprising expiration of a time period, in response to an operator's request, and at the completion of at least one print job.

20. The system according to claim 19, wherein said time period is specified by the operator or by the print system.

21. The system according to claim 20, wherein said time period specified by the operator is accomplished through at least one member selected from the group comprising check boxes, spin boxes, drop downs, and type-in fields.

22. The system according to claim 12, wherein the operator specifies an amount of time that must pass before said most recent generated resource management profile is invoked.

23. A resource management graphical user interface included in a computer-controlled printing system causes the computer to perform method steps for controlling the printing system to automatically generate resource management profiles to coordinate resource allocation within the printing system when the graphical user interface is accessed and utilized by an operator, the method comprising:

displaying at least one current resource management profile, wherein the resource management profile includes information related to a type and an amount of resources of the at least one collaborating device to be used for execution of a particular print job and wherein said current resource management profile comprises printing system resource allocations associated with specific said particular print jobs;

providing a resource management profile list, wherein said resource management profile list includes at least one profile name, wherein said profile name identifies a job type;

presenting features associated with said job type, wherein controls are provided to enable the operator to set allocations for resource usage;

providing an option to instruct the printing system to generate at least one the current resource management profile automatically;

providing an option to instruct the printing system to apply said generated resource management profile automatically;

presenting operational options to the operator, wherein said operational options include at least one member of the group comprising delete the current resource management profile, approve the current resource management profile, apply the current resource management profile to said particular print job, save a new resource management profile, replace an existing resource management profile, and cancel a resource management profile modification; and transmitting said instruction to apply at least one of the resource management profile, the new resource management profile and the existing resource management profile to a printing system for processing of at least one said particular print job.

24. The graphical user interface according to claim 23, wherein said job types comprise page description language job types.

25. The graphical user interface according to claim 23, wherein said controls enabling the operator to set allocations for resource usage include at least one member selected from the group comprising slider controls, dials, radio buttons, spin boxes, arrows, and resizable boxes.

* * * * *